United States Patent
Graefe et al.

(10) Patent No.: US 9,195,727 B2
(45) Date of Patent: Nov. 24, 2015

(54) DELTA PARTITIONS FOR BACKUP AND RESTORE

(71) Applicant: Hewlett-Packard Development Company, L.P., Fort Collins, CO (US)

(72) Inventors: Goetz Graefe, Madison, WI (US); Harumi Kuno, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 165 days.

(21) Appl. No.: 13/754,570

(22) Filed: Jan. 30, 2013

(65) Prior Publication Data

US 2014/0214767 A1 Jul. 31, 2014

(51) Int. Cl.
*G06F 7/00* (2006.01)
*G06F 17/30* (2006.01)

(52) U.S. Cl.
CPC .................. *G06F 17/30575* (2013.01)

(58) Field of Classification Search
CPC ........................ G06F 11/1448; G06F 17/30575
USPC ............................................. 707/645, 646, 647
See application file for complete search history.

(56) References Cited

U.S. PATENT DOCUMENTS

| | | | |
|---|---|---|---|
| 5,745,906 A | 4/1998 | Squibb | |
| 5,758,359 A * | 5/1998 | Saxon | 707/644 |
| 5,764,877 A | 6/1998 | Lomet et al. | |
| 5,778,395 A * | 7/1998 | Whiting et al. | 1/1 |
| 7,035,880 B1 * | 4/2006 | Crescenti et al. | 1/1 |
| 8,280,926 B2 * | 10/2012 | Sandorfi et al. | 707/812 |
| 8,473,462 B1 * | 6/2013 | Banerjee | 707/640 |
| 2003/0018657 A1 * | 1/2003 | Monday | 707/204 |
| 2005/0065985 A1 * | 3/2005 | Tummala et al. | 707/201 |
| 2005/0086443 A1 * | 4/2005 | Mizuno et al. | 711/162 |
| 2005/0216679 A1 * | 9/2005 | Levy | 711/162 |
| 2006/0059384 A1 * | 3/2006 | Helliker | 714/13 |
| 2006/0218203 A1 * | 9/2006 | Yamato et al. | 707/200 |
| 2006/0230082 A1 * | 10/2006 | Jasrasaria | 707/204 |
| 2009/0210429 A1 * | 8/2009 | Agrawal et al. | 707/10 |
| 2009/0307333 A1 * | 12/2009 | Welingkar et al. | 709/219 |
| 2010/0281013 A1 * | 11/2010 | Graefe | 707/715 |
| 2012/0151136 A1 | 6/2012 | Hay et al. | |
| 2013/0159248 A1 * | 6/2013 | Mueller | 707/609 |

OTHER PUBLICATIONS

Krueger, J., et al.; Aug. 27-31, 2012 Fast Updates on Read-optimized Databases Using Multi-core CPUS; http://www.vldb.org/pvldb/vol5/p061_jenskrueger_vldb2012.pdf.

Krueger, J., et al.; 2011; Applicabilty of GPU Computing for Efficient Merge in In-Memory Databases; http://www.adms-conf.org/p19-KRUEGER.pdf.

* cited by examiner

Primary Examiner — Cheyne D Ly
(74) Attorney, Agent, or Firm — Trenner Law Firm, LLC

(57) ABSTRACT

Systems and methods of using delta partitions for backup and restore are disclosed. An example method may include after a full backup, separating change information from static information. The method may also include concentrating the change information in a delta partition prior to a differential backup. The method may also include incrementally backing up only the delta partition during the differential backup.

18 Claims, 8 Drawing Sheets

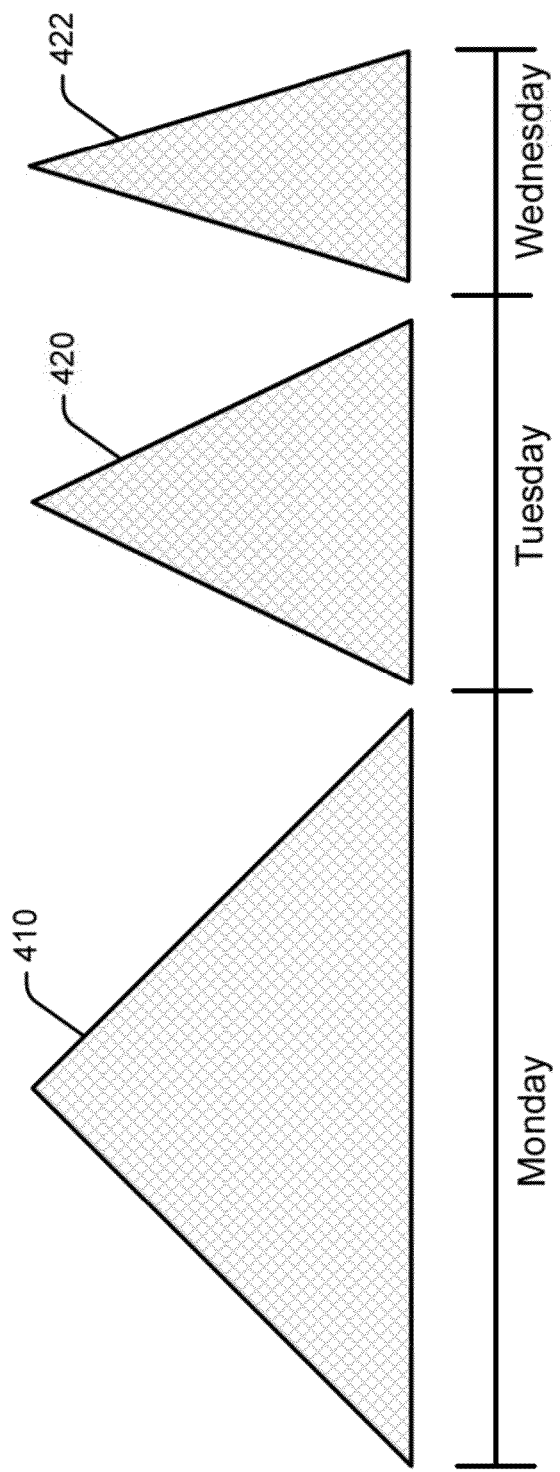

DELTA PARTITIONS FOR BACKUP AND RESTORE

BACKGROUND

Data loss due to media failure is a common concern, because storage media such as disk drives fail with alarming frequency. For example, one study of large data centers found that each year, 8-10% of all disk drives failed. Prediction of disk failures is very imprecise. Therefore, preemptive maintenance or replacement is neither certain to deter failures, nor cost-effective. The best way to safeguard data has been backup and restore operations.

Backup operations take a long time, sometimes several hours to complete. Even a single terabyte disk drive being backed up at a rate of 100 MB/sec takes about 3 hours to complete. Modern disk drives are often measured in multiple terabytes (TB) or more. For example, some modern applications collect multi-petabyte databases (e.g., years of online browsing or shopping behavior).

BRIEF DESCRIPTION OF THE DRAWINGS

FIG. 4A-4B illustrate an example use of delta partitions for backup and restore.

DETAILED DESCRIPTION

Figure 1:
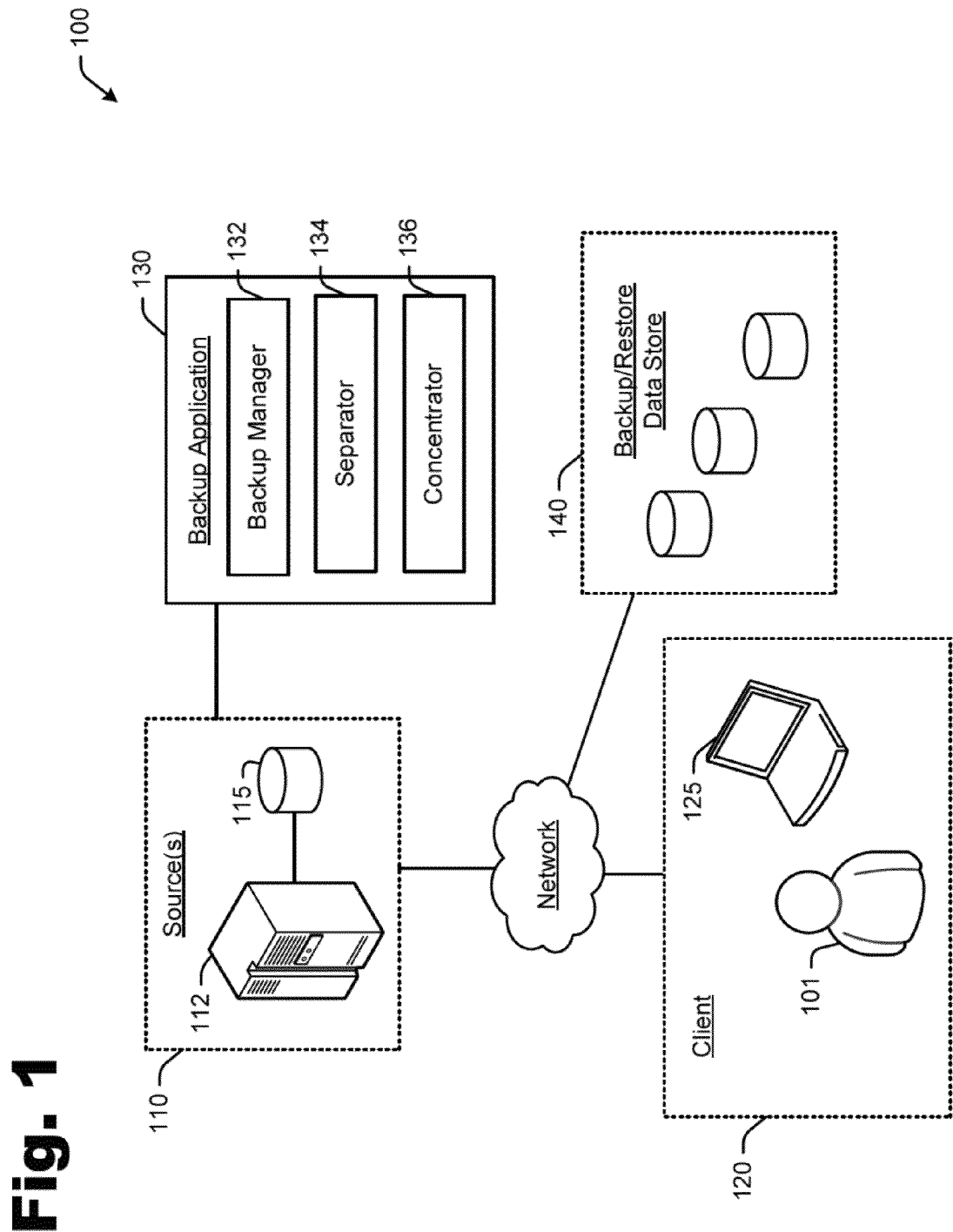
FIG. 1 is a high-level illustration of an example system which may implement delta partitions for backup and restore.

High availability of data in computing environments is a concern for information technology (IT) staff, including but not limited to database management. Even regular full backups followed by partial backups between each full backup, have drawbacks. For example, a database may be fully backed up every Sunday morning, followed by daily partial backups. But the partial backups save all data that has changed since the last full backup. As a result, the partial backup on Monday includes any changes since Sunday. The partial backup on Tuesday also saves any changes since Sunday, including those already saved during the partial backup on Monday. By the end of the week, there is not much savings, because the Saturday backup includes any changes already backed up on Monday, Tuesday, and so forth since the prior Sunday.

Furthermore, in a traditional database system, every data page that has any modified records is considered itself modified, and thus must be backed up. For purposes of illustration, there are five database pages shown in FIG. 4B (described in more detail below). Four of the five database pages include one or more modified records (illustrated as black squares). Every page including even one modified record has to be backed up.

The systems and methods described herein can reduce the total backup volume (and hence backup time), when compared to other backup techniques. Accordingly, the techniques described herein can reduce bandwidth and/or cost of backup and restore operations, without significantly increasing complexity, and without decreasing reliability of the backup/restore operations.

In an example, after a full backup, change information is separated from static information, and the change information is concentrated in 'buckets' referred to herein as a delta partition prior to each differential backup. Then, only the delta partition is backed up during the differential backup.

Continuing with the illustration above (shown in FIG. 4B, described in more detail below), there are still five pages in the database system. One of these pages is designated as a delta partition including all of the modified records (illustrated by the black squares) concentrated on one page (i.e., the delta partition data page). Thus, only the one delta partition data page has to be backed up by a differential backup.

When implemented in a database system, the techniques described herein may reduce the number of modified pages by orders of magnitude when compared to other partial backups. In an example, for a fixed number of modified records and multiple records per page, there are fewer pages in the delta partitions (each page full with updated records) than otherwise would need to be backed up. More specifically, if each page holds n records, a differential backup of delta partitions is n times smaller and faster than a partial backup. For example, if n=256, then the speedup exceeds two orders of magnitude. Accordingly, the number of modified pages can be minimized even when updates are spread out across large indexes. It is also noted that each physical location can have its own local set of delta partitions.

In addition, delta partitions can be easily merged and sorted, enabling a single restore pass and thus enhancing restore times. Adaptive merging of delta partitions may also implement compression in various forms (e.g., suppressing matching valid records and tombstone records, and suppressing out-of-date version records). In another example, the backup operation and the merge step can be integrated, instead of performing merge steps before the backup operations. That is, the merge process creates both new data pages and copies the new data pages onto the backup media. As such, integration saves one scan over the newly created runs.

While the systems and methods described herein are described for purposes of illustration with reference to distributed databases, and in an example using B-trees, it is noted that the techniques are applicable to any of a wide range of data management types and may be implemented using any of a variety of data structures.

Before continuing, as used herein the terms "includes" and "including" mean, but are not limited to, "includes" or "including" and "includes at least" or "including at least." The term "based on" means "based on" and "based at least in part on."

FIG. 1 is a high-level illustration of an example system 100 which may implement delta partitions for backup and restore. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a database service to a client 120, e.g., accessed by a user 101 via computing device 125. For purposes of illustration, the database service may be an online data processing service executing on host 110 configured as a server computer 112 with computer-readable storage 115. The database service may be accessed via application programming interfaces (APIs) and related support infrastructure, such as database engines.

The database service may include at least one remote source of content, and/or the database service may be operable to communicate with at least one remote source of content. That is, the source may be part of the database service, and/or the source may be physically distributed in the network and operatively associated with the database service. For example, the source 140 may include databases for providing information, applications for providing application data, storage resources for providing online storage facilities.

The database service may maintain data records, for example in a database or other data structure. For purposes of illustration, example data maintained by the database service may include, but is not limited to, government, commercial, and other sources of data sets hosted on the Internet or as dynamic data endpoints for any number of client applications. There is no limit to the type or amount of content that may be provided by the source. In addition, the content may include unprocessed or "raw" data, or the content may undergo at least some level of processing.

A backup application 130 may be implemented as program code providing backup/restore operations for the database service in the networked computer system 100. The backup application 130 may be executed by any suitable computing device to manage backup/restore for data or content at the host 110. In addition, the backup application 130 may serve one or more than one database service. In an example, the backup application 130 may be executed at the host 110. In another example, the backup application 130 may be cloud-based, wherein the application code is executed on at least one computing device local to the host 110, but having access to the backup application 130 via a cloud computing system.

In an example, the program code of the backup application 130 is implemented as an architecture of machine readable instructions (such as but not limited to, software or firmware). The machine-readable instructions may be stored on a non-transient computer readable medium and are executable by one or more processor to perform the operations described herein. It is noted, however, that the components described herein are provided only for purposes of illustration of an example operating environment, and are not intended to limit implementation to any particular system.

The program code executes the function of the architecture of machine readable instructions as self-contained modules. These modules can be integrated within a self-standing tool, or may be implemented as agents that run on top of an existing program code. In an example, the backup application 130 may include a backup manager 132, a separator 134, and a concentrator 136. The backup manager 132 may conduct a full backup and a differential backup of stored information. The separator 134 may operate on the stored information between the full backup and the differential backup to separate change information from static information. The concentrator 136 may store the change information in a delta partition prior to the differential backup, wherein the backup manager only backs up the delta partition during the differential backup.

For purposes of illustration, backup application 130 may execute a full database backup by copying each database page from the active database to a copy that subsequently becomes a read-only file stored at data store 140. A differential backup copies only those database pages to the data store 140 that have changed recently. These pages may be identified in a full database scan (by the log sequence number within the page header) or by some other data structure, e.g., information in the data structures primarily used for free space management or in a page recovery index.

It is noted that a differential backup, in comparison with a full backup, reduces the resources required to take a backup. For example, if only 1% of database pages changed recently, the backup might be completed in 1% of the time and with 1% of the backup media. On the other hand, a differential backup adds value in conjunction with a full backup. "Recent" changes are defined as those changes which have occurred since the last full backup, or since the last differential backup. In the former case, media recovery uses only one differential backup file in addition to the full backup. But backup operations take longer and longer until the next full backup. In the latter case, media recovery uses multiple differential backup media, but the differential backup time remains relatively constant day to day.

In some contexts, "differential backups" may be defined relative to the most recent full backup, and "incremental backups" may be defined relative to the most recent backup, whether that is a full or partial backup. On the other hand, an "incremental archive copy" is defined relative to the last "full archive copy." As used herein, the terms, "differential" and "incremental" backups are used interchangeably, and possible distinctions are called out explicitly as necessary.

The backup and restore techniques described herein may be implemented to reduce the size of differential backups, independent of the details of the backup process. In an example, the systems and methods described herein may utilize physiological logging, as employed in most database management systems. The increases in efficiency using the backup and restore techniques described herein may be better understood with reference to the following illustration.

The tables shown below provide example sizes and calculations scaled to a single disk of 1 TB. The values presented in Tables 1 and 2 are only intended to be illustrative and not limiting. Many of the equalities shown are approximate. For example, $2^{10}=10^3$ or 1 day=$10^5$ seconds.

With reference to Table 1, each logical row (including overheads for variable-size fields and records) uses a record of 256 bytes in the table's primary data structure, and an entry of 32 bytes in each of two secondary indexes. Overhead in the indexes is accounted for by the entry size (e.g., 24 actual bytes plus ~30% free space, plus ~1% non-leaf pages). Each logical row uses about 256+2×32=320 bytes; with an assumed space utilization of 32%, a disk of 1 TB holds $10^9$ records on 32 M data pages and 4 M pages per index.

TABLE 1

Assumed sizes for rows in a table.

| | |
|---|---|
| Data record size | 256 B |
| Records per data page | 32 |
| Index entry size | 32 B |
| Entries per index page | 256 |
| Index count per table | 2 |
| Item size incl indexes | 320 B |

With reference to Table 2, a sustained per-disk backup bandwidth of 100 MB/sec, a full disk backup of 1 TB takes 10,000 seconds or about 3 hours to complete. During this time, the backup typically permits concurrent queries and updates. While concurrent queries and updates are active, the sustained per-disk backup bandwidth may fall from 100

MB/sec to 10 MB/sec (e.g., a full order of magnitude), increasing disk backup time from 3 hours to over one day. Due to disk utilization of only about 32%, a full database backup can thus take 3,200 seconds or about 1 hour at 100 MB/sec (offline) or 10 hours at 10 MB/sec (online).

TABLE 2

Space calculation per disk drive.

| | |
|---|---|
| Disk size | 1 TB |
| Page size | 8 KB |
| Page count | 128M |
| Disk space utilization | 32% |
| Allocated pages | 41M |
| Item count per disk | $10^9$ |
| Data pages | 32M |
| Index pages, per index | 4M |

Table 3 shows an example update load for this database, again scaled to an individual disk. Insertions and deletions both equal one million rows or about 1 GB of data per day (e.g., assuming the total data volume remains constant and turns over in about a year). Moreover, if there are one million updates every day (or slightly above 10 per second on average), each update modifies only 16 bytes in a data record and only one secondary index.

TABLE 3

Assumed database changes, per disk drive.

| Per day | Items per day | Bandwidth | |
|---|---|---|---|
| Insertions | 4M | 1 GB/day | 10 KB/sec |
| Updates | 1M | 16 MB/day | 0.2 KB/sec |
| Deletions | 4M | 1 GB/day | 10 KB/sec |

Table 4 shows the counts of data pages and of index pages affected by changes. For data pages alone (e.g., ignoring indexes and index pages), a daily differential backup copies about 1.25 million pages or about 10 GB of data to the backup media.

TABLE 4

Daily differential backup, per disk drive.

| Per day | Data pages | Index pages |
|---|---|---|
| Insertions | 125K | 4M |
| Updates | 1M | 1M |
| Deletions | 125K | 4M |
| Any change | 1¼M | 9M |

This calculation assumes that updates touch data pages randomly, whereas insertions and deletions are strictly sequential. Thus, updates affect one million pages, whereas insertions fill only 1 GB÷8 KB=125 K pages. The updates dominate insertions and deletions, and it barely matters whether data pages need backing up after deletions. Compared to a daily full disk backup of 1 TB, a differential backup of 10 GB is an improvement by a factor of 100 or two orders of magnitude. Compared to a database backup of 320 GB, 10 GB is an improvement by a factor of 32 or about one and one-half orders of magnitude.

With an offline backup bandwidth of 100 MB/sec, 10 GB require 100 seconds or almost 2 minutes. Note that some systems support differential backups only relative to a full backup, not relative to the preceding differential backup. In other words, a differential backup one day after a full backup may take about 2 minutes but the differential backup two days after the full backup takes about 4 minutes, etc. After 6 days, a differential backup requires about 10 minutes. If the online backup bandwidth is only 10 MB/sec, the backup time increases from about 17 minutes (1,000 seconds) to about 100 minutes over the course of a week.

If the calculation covers both data pages and index pages, the situation changes dramatically. Index maintenance, and backup of index pages, diminishes the advantage of differential backups. In this example, any advantage is lost entirely, because practically every index page changes every day and thus participates in every daily backup. The daily backup volume for data and index pages is 9 M pages or 72 GB, which requires 12 minutes offline (72 GB÷100 MB/sec) or 2 hours online (72 GB÷10 MB/sec). Over the course of a week, this may grow by one-half million pages per day (for additional data pages, with no additional index pages) to about twelve million pages (or about 100 GB of data), taking 17 minutes offline, or 3 hours while the database remains online.

As such, using partial backups appears to offer little, if any benefit, when a database with mostly static data, with hardly any indexes on the large tables, or with indexes on attributes with high correlation to the load sequence such as an index on order number. But the techniques described herein use differential backups to increase efficiency of backup and restore operations by improving the volume and elapsed time of differential backups.

A differential backup copies any page that has been updated since the last backup. Put differently, the backup operation copies an entire page even if only a few bytes have been modified. For example, changing a single index entry of 20-30 bytes may add 8 KB to the next differential backup. Thus, even in a differential backup with recent updates, a tremendous amount of the backup volume has not changed at all. These changes can be concentrated in dedicated pages. In other words, when a differential backup starts, most database pages are entirely unchanged and some (relatively few) pages are full with recent changes.

An example of a data structure that enables this approach without reducing search and query performance is a partitioned B-tree, although other data structures may also be implemented. A partitioned B-tree uses partitions to separate change information from static information. The partitions with change information, referred to herein as "delta partitions," include newly inserted records, "tombstone" records indicating deletions, updates (modeled as deletion plus insertion), and physical versions of the same logical record (in the context of multiversion concurrency control, for example). Physical compression may exploit similar records within the same page (e.g., after updates or in version records).

Partitioned B-trees are B-trees with an artificial leading key field added to a user-defined key. Distinct values in this field define partitions within the B-tree. Partitions appear and disappear due to record insertion and deletion, with no catalog modification. Records with the same value in this field can be searched efficiently. The desired steady state is to have only a single partition, but multiple partitions may also be utilized. For example, temporary additional partitions enable optimizations during index creation, roll-in (loading), and roll-out (purging). Moreover, external merge sort can store runs in B-tree partitions with benefits for deep read-ahead, pause-and-resume, and dynamic resource management. Optimization from multiple partitions to a single one uses the same merge logic as traditional merge sort.

Operation of the backup application 130 can be better understood with reference to the following discussion of partitioned B-trees. However, the operations described herein are not limited to any specific implementation.

Figure 2:
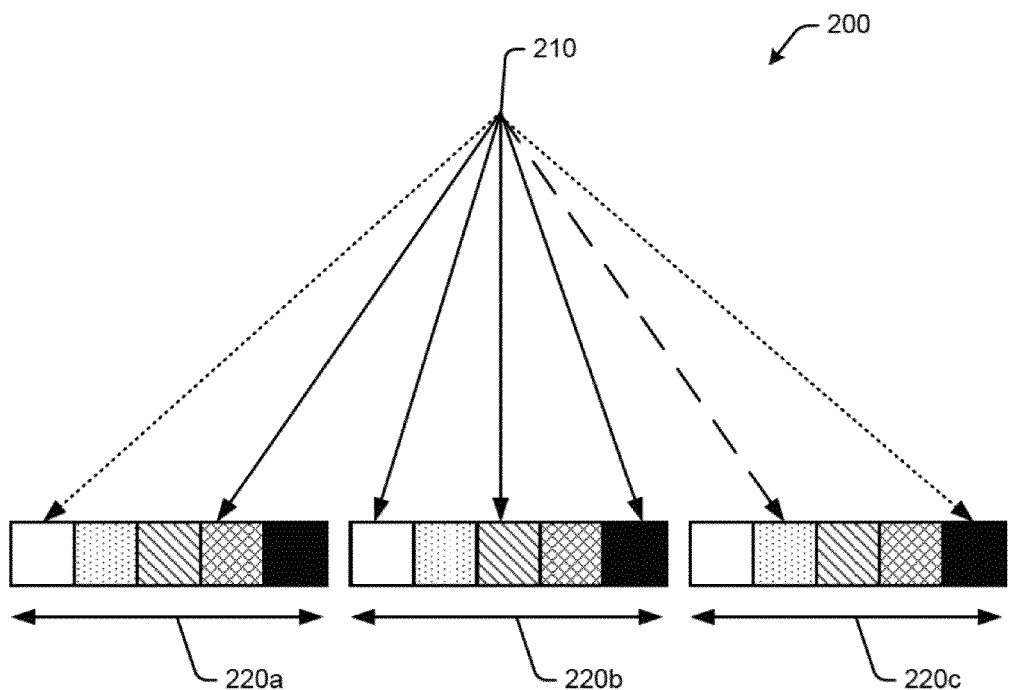
FIG. 2 illustrates an example partitioned B-tree which may be used with delta partitions for backup and restore.

FIG. 2 illustrates an example partitioned B-tree 200 which may be used with delta partitions for backup and restore. In this example, the partitioned B-tree includes a root 210 and leaves including partitions 220a-c of records (illustrated by different shaded boxes in each sequence). The partitioned records are identified by an artificial leading key field in each record.

During operation, stable data and recent changes may be separated. In an example, a query enumerates and searches each of the partitions. In an example, a root-to-leaf probe is used to find the next actual value in the artificial leading key field, and another probe is used to apply the query predicate within the partition. The number of probes can be reduced to one per partition.

Adaptive merging implements the efficiency of merge sort for adaptive and incremental index optimization. Adaptive merging uses partitioned B-trees, for example, to focus merge steps on those key ranges that are relevant to actual queries, to leave records in all other key ranges in their initial places, and to integrate the merge logic as side effect into query execution, which is illustrated in FIG. 3.

Figure 3:
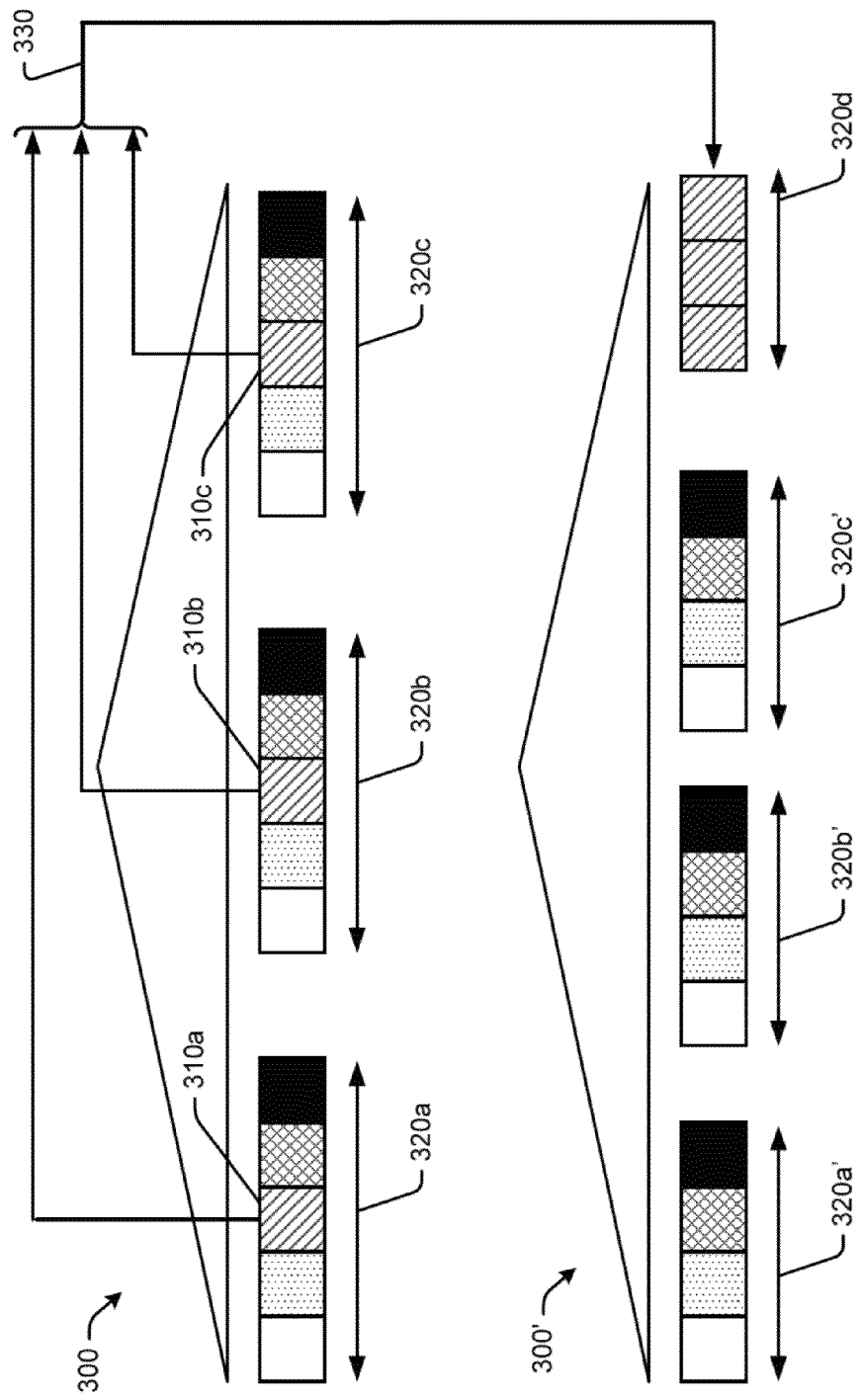
FIG. 3 illustrates an example of adaptive merging which may be used with delta partitions for backup and restore.

FIG. 3 illustrates an example of adaptive merging which may be used with delta partitions for backup and restore. The top portion of FIG. 3 shows a B-tree 300 when a query starts, after run generation (which may have been a result of an earlier query). In processing the query, records 310a-c from each partition 320a-c satisfying a query predicate (e.g., indicating a change) are automatically merged into a new partition 320d, as illustrated by a modified B-tree 300'. In this example, a single merge step (illustrated by arrows 330) may be used to merge records 310a-c from all existing partitions into the new partition, or delta partition 320d. The modified B-tree 300' is shown in the bottom portion of FIG. 3 having modified partitions 320a'-320c' and the delta partition 320d.

For a fixed number of modified records and multiple records per page, there are fewer pages in delta partitions (each page full with updated records) than there are modified pages in a B-tree with only a single partition, with all updates randomly strewn across all leaf pages. More specifically, if each page holds n records, a differential backup of delta partitions is n times smaller and faster than a differential backup of traditional B-trees. For the parameters of FIG. 2, n=256, i.e., the speedup exceeds two orders of magnitude.

The fraction of changed database records bounds the achievable speedup. For example, if one-quarter of all records in a database change between differential backups, the backup volume will be one-quarter of the database size, independent of the number of records (or index records) per page.

It is noted that new delta partitions 320 may be created every time a backup is conducted. Those delta partitions already backed up become read-only, and new delta partition(s) are created until the next backup. New delta partitions may also be created when a delta partition exceeds the memory size. A new and empty delta partition can alleviate the need for paging. By way of illustration, each partitioned B-tree may have two delta partitions in memory, one to capture the most recent updates and one to provide efficient access to records and versions of the recent past.

Insertions of new B-tree entries can be directed to appropriate partitions called delta partitions here. Deletions are realized by insertion of "tombstone" records. Updates of existing index entries are realized as pairs of deletion and insertion, with opportunities for compression.

If multiple delta partitions exist, these partitions may be merged, e.g., using adaptive merging. After a delta partition has been backed up, the delta partition may remain unchanged in order to avoid another backup of the same information. In an example, recent delta partitions may be merged immediately preceding a differential backup and all delta partitions may be merged with the master partition immediately preceding a full backup.

It is noted that adaptive merging of delta partitions may include compression in various forms (e.g., suppressing matching valid records and tombstone records, and suppressing out-of-date version records). Moreover, rather than performing merge steps before backup operations, the backup operation and the merge step can be integrated. In this example, the merge process both creates new data pages and immediately copies them on the appropriate backup media. This integration saves one scan over the newly created runs or B-tree partitions.

It is also noted that use of delta partitions may also reduce the database size, by allowing pages to be filled to their maximum capacity. For example, B-trees allow 100% full pages, but since any insertion forces a node split and then seek operations during scans. B-trees are often only loaded to 80-90% full. Random insertions and deletions stabilize average page utilization around 70%. For a fixed number of records, a database with pages 70% full is almost 50% larger than one with pages 100% full. With a fixed buffer pool, the savings in input/output operations can be even greater.

Figure 4B:
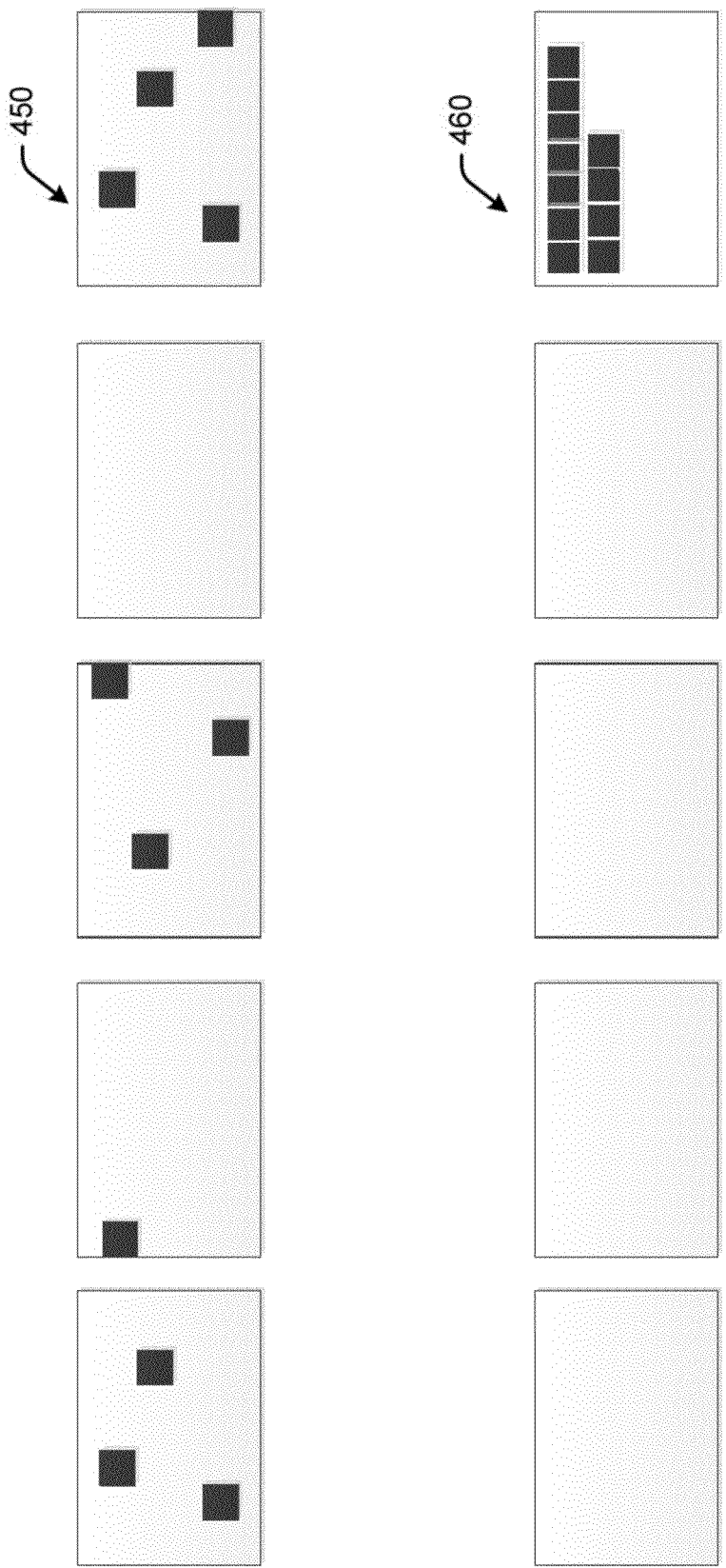

FIG. 4A-4B illustrate example uses of delta partitions for backup and restore. In the example shown in FIG. 4A, a master partition 410 and two delta partitions 420 and 422 are shown together with an example backup schedule. After a backup on Monday, the delta partition 410 remains read-only and does not need to be backed up again until the next full backup. Similarly, the delta partition 420 remains read-only after the differential backup on Tuesday and does not need to be backed up again until the next full backup. And likewise, the delta partition 422 remains read-only after the differential backup on Wednesday and does not need to be backed up again until the next full backup.

As can be seen in FIG. 4B, the multiple database pages 450 have modified data records (illustrated by the black squares) spread out over four of the five pages. Backing up the database pages 450 would back up four of the five pages shown. But using the delta partition technique described herein, the modified data records can be combined on a single one of the multiple database pages 460.

Thus, it can be seen in FIGS. 4A and 4b that the delta partitions reduce the number of recently updated pages in a database that need to be backed up. The backup logic does distinguish that most of the pages saved in the differential backup happen to belong to delta partitions. But by not having to backup all of the changed pages every time a differential backup is conducted, the duration of the backup operation can be significantly reduced. Like the backup operation, the restore operation is faster due to the smaller number of pages in each differential backup.

It is noted that partitioned B-trees with delta partitions and adaptive merging can be thought of in similar terms as run generation and merging in an external merge sort. Thus, several optimizations are transferable. Run generation by replacement selection (rather than quicksort) is one such example.

By default, all changes go to a single active delta partition. While this delta partition fits in memory or the buffer pool, even random insertions are very efficient. When the partition reaches its designated maximal size, a new, empty partition becomes the active partition. The operation can be implemented similar to a merge sort with run generation using read-sort-write cycles and quicksort (see FIG. 5 below).

Run generation using replacement selection (i.e. a priority queue) can also be utilized for delta partitions. That is, there are two active delta partitions at all times, with a sliding boundary key value directing insertions to one or the other. If the total size of the two delta partitions exceeds a designated maximum, the boundary key value can be increased such that some key range is now directed to the newer of the two delta partitions. This key range is initially empty in the new delta partition. After this adjustment, pages of the older partition holding records in this key range can be evicted from the buffer pool, possibly with some reorganization for data compression and for elimination of free space in the B-tree pages.

Figure 5:
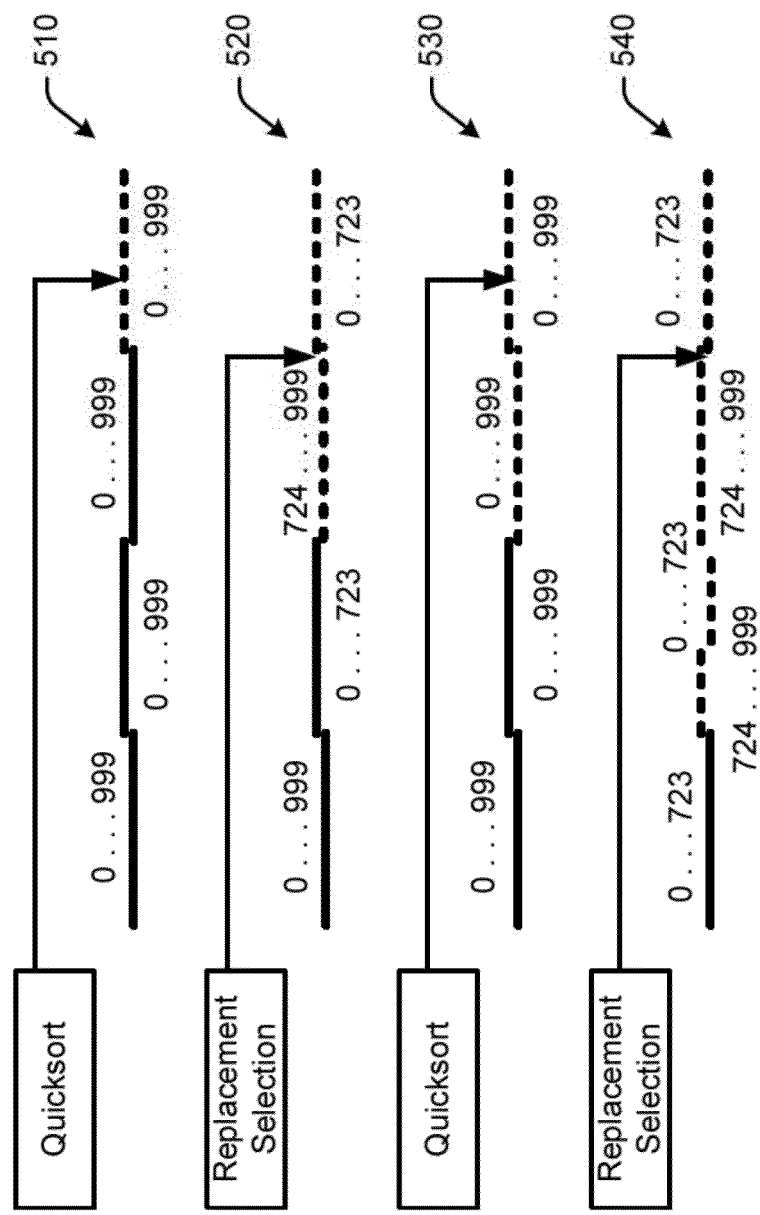
FIG. 5 illustrates an example of run generation with retention which may be used with delta partitions for backup and restore.

Combining the benefits of retaining a complete recent delta partition and of a sliding boundary key value uses three delta partitions in memory, as illustrated in FIG. 5. FIG. 5 illustrates an example of run generation with retention which may be used with delta partitions for backup and restore. In this example, a key value domain 0.999 has a current boundary key value of 723. Insertions with key values up to 723 go into the latest delta partition. Insertions with key values above 723 go into the second-to-latest delta partition. Searches for values up to key value 723 go into the latest and the second-to-latest delta partitions. Searches for key value above 723 go into the second-to-latest and the third-to-latest delta partition. The buffer pool may evict pages of the third-to-latest delta partition with key values up to 723.

In FIG. 5, diagram 510 shows quicksort with one run being built in the buffer pool. Diagram 520 shows run generation by replacement selection. The current boundary key value is 723. Diagram 530 shows quicksort with the second-to-last run retained in the buffer pool for efficient search of recent data. While the last run (shown with a dotted line) absorbs current insertions, the prior run (shown with a dashed line) lingers in the buffer pool. Diagram 540 shows replacement selection with a boundary key value and with the buffer pool retaining a complete run for efficient search of recent insertions. The replacement selection doubles the expected run size and retaining a prior run cuts it in half. Thus, the expected run size in diagram 540 is about equal to that of diagram 510.

Figure 6:
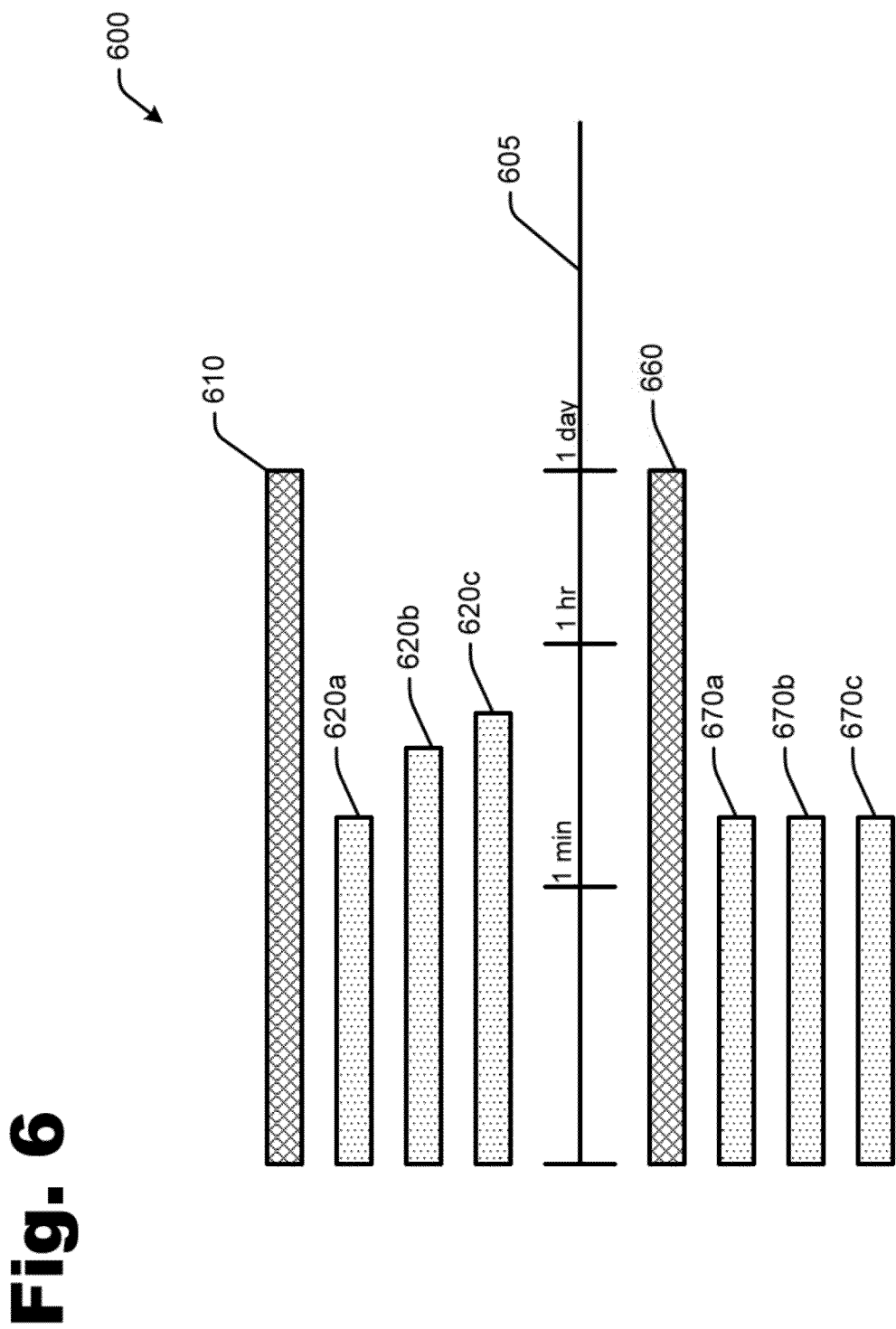
FIG. 6 illustrates an example comparison of duration of smaller differential backups to a traditional backup.

FIG. 6 illustrates an example comparison of duration of smaller differential backups to a traditional backup. The timeline in the center is an approximate logarithmic scale for illustration purposes.

An example traditional backup operation 600 is shown above the timeline 605. In this example, a full backup 610 occurs on Monday, and is followed by daily backups 620*a-c* on the following three days. It can be seen that the daily backups 620*a-c* are much faster than the full backup 610. But this is not always the case. In any event, the time to complete each daily (partial) backup (e.g., 620*c*) takes longer than the previous daily (partial) backup (e.g., 620*b*).

An example backup using delta partitions 650 is shown below the timeline 605. In this example, a full backup 660 occurs on Monday, and is followed by daily backups 670*a-c* on the following three days. It can be seen that the daily backups 670*a-c* are much faster than the full backup 610. In addition, the time to complete each daily (differential) backup (e.g., 670*c*) takes about the same time as the previous daily (differential) backup (e.g., 670*b*). While the differential backups may vary in size from day to day (and thus in backup time), the differential backups are much smaller and faster than the full backup and do not continue growing because the differential backups are not accumulating changes across the days.

Before continuing, it should be noted that the examples described above are provided for purposes of illustration, and are not intended to be limiting. Other devices and/or device configurations may be utilized to carry out the operations described herein.

Figure 7:
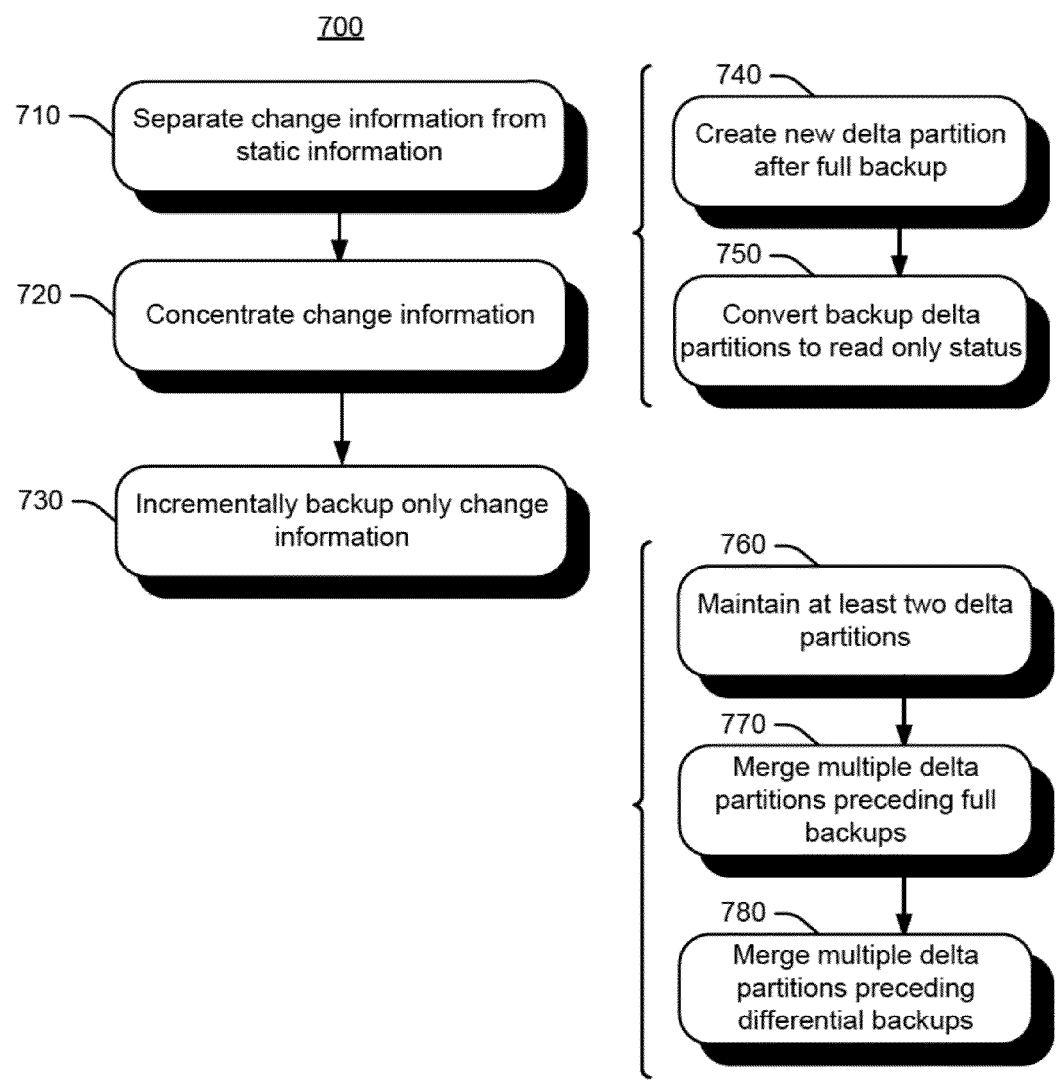
FIG. 7 is a flowchart illustrating example operations which may implement delta partitions for backup and restore.

FIG. 7 is a flowchart illustrating example operations which may implement delta partitions for backup and restore. Operations 700 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 710 includes after a full backup, separating change information from static information. Operation 720 includes concentrating the change information in a delta partition prior to a differential backup. The delta partitions with the change information, may include newly inserted records, "tombstone" records indicating deletions, updates (e.g., modeled as deletion plus insertion), and physical versions of the same logical record (e.g., in the context of multi-version concurrency control). Physical compression may be used on similar records within the same page (e.g., after updates or in version records).

Operation 730 includes incrementally backing up only the delta partition during the differential backup. When a differential backup starts, most of the database pages are entirely unchanged, and some (relatively few) delta partition(s) with the recent changes. By only having to backup the delta partition, the elapsed times for backup and restore operations are reduced.

The operations shown and described herein are provided to illustrate example implementations. It is noted that the operations are not limited to the ordering shown. Still other operations may also be implemented.

In an example, operation 740 includes creating a new delta partition after each full backup. Operation 750 includes converting backed up delta partitions to read-only status.

In another example, operation 70 includes maintaining at least two delta partitions, one of the delta partitions including most recent updates and another one of the delta partitions providing access to records and recent past versions. Operation 770 includes merging all multiple delta partitions immediately preceding full backups. Operation 780 includes merging multiple recent delta partitions immediately preceding differential backups.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method, the method stored as instructions on a non-transitory computer-readable medium executable by a processor comprising:
   after a full backup of stored information, separating change information of the stored information from static information of the stored information;
   concentrating the change information in a delta partition prior to a differential backup; and incrementally backing up only the delta partition during the differential backup,
wherein the stored information is in a B-tree, and the delta partition is a dedicated partition for maintaining change information in the B-tree.

2. The method of claim 1, further comprising creating a new delta partition after each full backup.

3. The method of claim 1, further comprising converting backed up delta partitions to read-only status.

4. The method of claim 1, further comprising maintaining at least two delta partitions, one of the delta partitions including most recent updates and another one of the delta partitions providing access to records and recent past versions.

5. The method of claim 1, further comprising managing deletions by inserting tombstone records in the delta partition.

6. The method of claim 1, further comprising merging all multiple delta partitions immediately preceding full backups.

7. The method of claim 1, further comprising merging multiple recent delta partitions immediately preceding differential backups.

8. A system, comprising instructions stored on a non-transitory computer-readable medium executable by a processor to implement:
a backup manager conducting a full backup and a differential backup of stored information;
a separator operating on the stored information between the full backup and the differential backup to separate change information from static information; and
a concentrator to store the change information in a delta partition prior to the differential backup, wherein the backup manager only backs up the delta partition during the differential backup,
wherein the stored information is in a B-tree, and the delta partition is a dedicated partition for maintaining change information in the B-tree.

9. The system of claim 8, further comprising a new delta partition for each full backup.

10. The system of claim 8, wherein backed up delta partitions are converted to read-only status.

11. The system of claim 8, wherein at least one delta partition includes most recent updates and at least one delta partition provides access to records and recent past versions.

12. The system of claim 8, wherein all delta partitions are merged immediately preceding full backups.

13. The system of claim 8, wherein multiple recent delta partitions are merged immediately preceding differential backups.

14. The system of claim 8, wherein the stored information includes indexes stored on pages in a database structure, and the delta partition is a dedicated page in the database structure.

15. The system of claim 8, further comprising a query engine to locate records satisfying a query predicate, the query predicate indicating the change information, wherein the located records are automatically merged into the delta partition.

16. A system including machine readable instructions stored as program code on a non-transitory computer readable medium, the machine readable instructions executable by a processor to:
separate change information from static information following a full backup;
concentrate the change information in a delta partition prior to a differential backup;
and back up only the delta partition during the differential backup,
wherein the stored information is in a B-tree, and the delta partition is a dedicated partition for maintaining change information in the B-tree.

17. The system of claim 16, wherein the stored information includes indexes stored on pages in a database structure, and the delta partition is a dedicated page in the database structure.

18. The system of claim 16, wherein the machine readable instructions are further executable by the processor to locate records satisfying a query predicate, the query predicate indicating the change information, wherein the located records are automatically merged into the delta partition.

* * * * *